United States Patent Office 3,517,263
Patented June 23, 1970

3,517,263
CAPACITOR VOLTAGE TRANSFORMER
Toshio Okamura, Sigeya Izumi, and Isao Watanabe, Kyoto, Japan, assignors to Nissin Electric Co., Ltd., Kyoto, Japan, a company of Japan
Filed May 31, 1967, Ser. No. 642,387
Claims priority, application Japan, May 31, 1966, 41/51,576
Int. Cl. H02h 7/00, 7/14, 7/16
U.S. Cl. 317—12                                    5 Claims

ABSTRACT OF THE DISCLOSURE

A capacitor voltage transformer of the resonance type wherein a protective shunt circuit is connected across one or more of the resonant impedance elements included in the device, the shunt circuit including a bi-directional avalanche device, for example a silicon symmetrical switch. When a disorder in the secondary circuit causes the terminal voltage across the impedance element to exceed a predetermined level, the switch becomes conductive, shunting the resonant impedance element and changing the resonant condition of the circuit so that the large current caused by the disorder is suppressed for protection of the device. A dual capacitor voltage transformer is also disclosed, having means coupled to the secondary windings of the intermediate transformers thereof to distinguish between a disorder in the system line to which the transformer is connected and a disorder in the secondary circuit in the transformer itself.

BACKGROUND AND SUMMARY OF THE INVENTION

Figure 1:
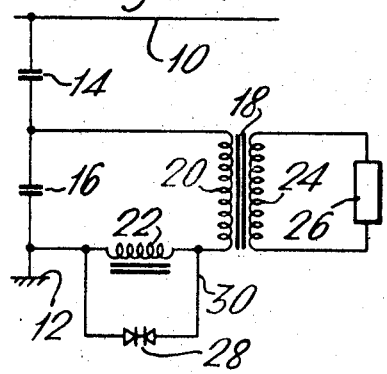

This invention provides a capacitor voltage transformer of resonance type wherein a protective shunt circuit is connected across one or more of the resonant impedance elements included in the device and comprises at least a silicon symmetrical switch so that when a disorder in the secondary circuit of an intermediate transformer included in the device causes the terminal voltage across the impedance element to exceed a predetermined level, the silicon symmetrical switch becomes conductive, thereby shunting the resonant impedance element and, consequently, changing the resonant condition of the device so as to suppress the large current caused by the disorder for protection of the device.

As is well known, a capacitor voltage transformer comprises a coupling capacitor and a shunt capacitor connected in series between a system line and ground, and a series combination of a resonant reactor and the primary winding of an intermediate transformer connected across the shunt capacitor, with a suitable load connected to the secondary winding of the intermediate transformer. When a disorder such as a short circuit condition occurs in the secondary circuit of the intermediate transformer, there will result an abnormal increase in the terminal voltage of the shunt capacitor, the coupling capacitor and the reactor, so that these impedance elements will be in danger of being broken down.

To prevent this, it has been customary to connect a protective shunt circuit including a discharge gap across the reactor or other resonant impedance elements, so that the abnormal voltage causes a discharge across the gap, thereby bypassing the resonant impedance element. This causes the resonant condition of the capacitor voltage transformer at the fundamental frequency to be varied so that the short circuit current will be greatly reduced.

In another of the prior art arrangements, the protective shunt circuit is formed by a series combination of a discharge gap and a capacitor having an impedance nearly equal to the impedance of the resonant reactor, or a combination of a capacitor and a resistor, so that when a discharge occurs across the gap, the reactor and the capacitor forms a parallel resonant circuit, which presents a combined impedance high enough to suppress the short circuit current to flow through these main impedance elements.

In either case, a discharge gap is employed to protect the capacitor voltage transformer against flow of a large current therethrough caused by a fault short circuit condition in the secondary circuit of the intermediate transformer. The discharge gap, however, has various defects, such as: that it is rather unstable in commencement of discharge and its termination, so that the voltage level expected to initiate a discharge does not actually start a discharge, or even after the disorder in the secondary circuit of the intermediate transformer has been remedied, the discharge will sometimes not stop but continue; that the discharge characteristics vary with climate or after a long use; that dusts, insects and/or dew are likely to stick to the discharge electrodes to cause damage thereto or erroneous discharges to take place; and that the discharge gap is so narrow that its adjustment is difficult and troublesome.

Accordingly, the primary object of the invention is to protect the impedance elements employed in a capacitor voltage transformer against damage due to disorders such as a short circuit condition in the secondary circuit of the intermediate transformer in the capacitor voltage transformer. To accomplish the object, the invention provides a protective shunt circuit connected across at least one of the impedance elements constituting the capacitor voltage transformer, and the shunt circuit includes no discharge gap at all or may include a discharge gap but not as a main conductive element of the shunt circuit upon occurrence of a short circuit condition in the secondary circuit of the intermediate transformer. Instead, the shunt circuit of the invention includes a silicon symmetrical switch (to be referred to hereinafter as an SSS). As is well known, the SSS is of such a characteristic that so long as a voltage lower than a predetermined level is impressed thereon, it retains a high resistance, but that when the impressed voltage exceeds the predetermined level, the phenomenon known as "avalanche" occurs therein to promptly reduce its resistance to the state of conduction, and that when the impressed voltage decreases below the predetermined level, the nonconductive condition is restored. This characteristic is very stable, that is, the change from the nonconductive to the conductive condition is effected without fail. The voltage enough to cause avalanche will be referred to as the avalanche voltage. Thus, if the SSS is selected of an avalanche voltage equal to the permissible voltage on the impedance element, the SSS becomes conductive when the terminal voltage across the impedance element exceeds the tolerable voltage level, thereby bypassing the resonant impedance element for protection thereof and of the capacitor voltage transformer.

Figure 2:
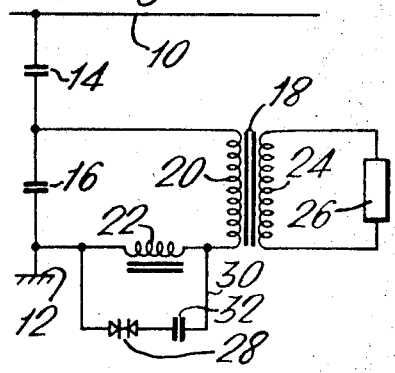
Figure 3:
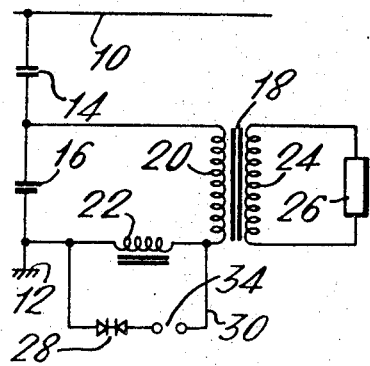
Figure 4:
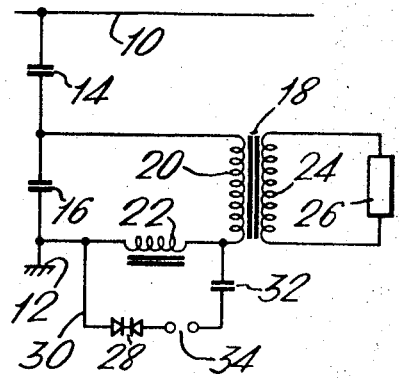
Figure 5:
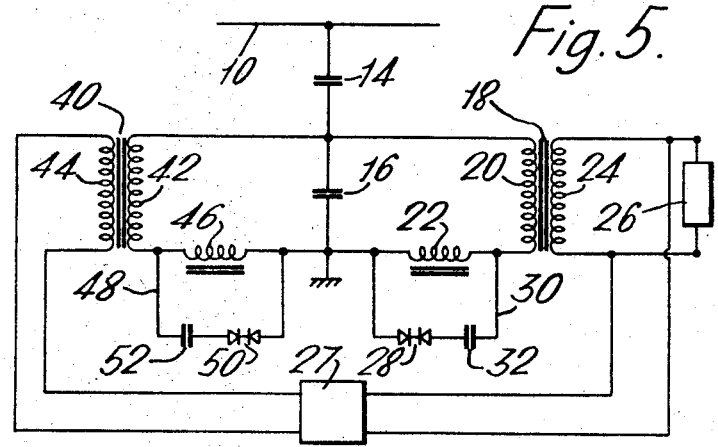

The invention will be better understood from the following description of preferred embodiments thereof with reference to the accompanying drawings, wherein:

FIGS. 1 through 4 are circuit diagrams of different embodiments of the invention; and FIG. 5 is a circuit diagram showing the arrangement of FIG. 2 as applied to a twin-type capacitor voltage transformer.

Referring to FIG. 1, there is shown a series combination of a coupling capacitor 14 and a shunt capacitor 16 connected between a system line 10 and ground 12. An intermediate transformer 18 has its primary winding 20 connected across the shunt capacitor 16, with a resonant reactor 22 being connected in series with the primary winding 20. To the secondary winding 24 of this transformer 18 is connected a suitable load 26 such as relays or measuring instruments. So far, the arrangement of the capacitor voltage transformer of the invention discloses nothing unknown in the art. By the way, the reactor 22 has a rectance value such that it satisfies the condition for series resonance to the combined capacitance of the capacitors 14 and 16.

The shunt circuit 30 may also be connected across one or more of the other resonant impedance elements, or to the reactor 22 as a secondary circuit thereof. The reactor 22 may be connected in the secondary circuit of the intermediate transformer.

What distinguishes the present invention from the prior art arrangements is the provision of a protective shunt circuit 30 including an SSS 28 connected across the resonant reactor 22. In other words, the SSS 28 is connected in accordance with the invention where a discharge gap was connected in the prior art arrangements. As previously mentioned, the SSS 28 is selected of an avalanche voltage equal to the maximum terminal voltage allowable to be impressed on the reactor 22.

Under the normal operating condition of the capacitor voltage transformer, the voltage impressed on the SSS 28 is lower than its avalanche voltage, so that the SSS is kept nonconductive and, consequently, the presence of the shunt circuit 30 is negligible. If a disorder such as a short circuit condition occurs in the secondary circuit of the transformer 18, a large current will flow, thereby effecting an abnormal rise in the terminal voltages across the reactor 22, the shunt capacitor 16 and the coupling capacitor 14. When the terminal voltage across the reactor 22 has exceeded the avalanche voltage of the SSS 28, it becomes conductive to close the shunt circuit 30. In other words, the reactor 22 is bypassed by the circuit 30. This changes the resonant condition of the device at the fundamental frequency, so that the primary circuit of the transformer 18 now presents a higher impedance sufficient to suppress the short circuit current which would otherwise be in danger of destroying the resonant impedance elements 22, 14, or 16.

When the short circuit condition has been cleared, the normal terminal voltage across the reactor 22 is restored, which is below the avalanche voltage of the SS, so that the normal operating condition of the device is restored.

FIG. 2 shows an arrangement which is more effective than that of FIG. 1. Here, the protective shunt circuit 30 comprises a series combination of an SSS 28 and a capacitor 32, which latter has a reactance value such as to saisfy the condition for a parallel resonance with the resonant reactor 22. As previously mentioned, when the voltage impressed on the SSS 28 has exceeded its avalanche, voltage, the SSS becomes conductive so that a parallel resonant circuit is formed by the reactor 22 and the capacitor 32. This parallel resonant circuit provides an impedance higher enough to effectively block the large short circuit current.

Thus, the use of an SSS can eliminate the defects which accompany the use of a discharge gap for the same purpose. In the arrangements of FIGS. 1 and 2, however, even when the capacitor voltage transformer operates normally the terminal voltage of the resonant reactor 22 is always impressed on the SSS 28. This not only tends to shorten the life of the SSS but also makes it difficult to find out if the SSS has been broken down. If the SSS is left as it has been destroyed, it cannot perform its intended protective function.

To the solution of this problem the arrangements of FIGS. 3 and 4 are directed. First in FIG. 3, the shunt circuit 30 comprises a series combination of an SSS 28 and a discharge gap 34. The voltage that initiates a discharge across the gap 34 is adjusted nearly equal to or lower than the avalanche voltage of the SSS. The terminal voltage across the reactor 22 is here divided to be impressed partly on the SSS 28 and partly on the gap 34.

So long as the capacitor voltage transformer operates normally, the voltage across the SSS 28 is lower than its avalanche voltage and the voltage across the discharge gap 34 is lower than the level that initiates a discharge thereacross, so that the SSS will not be rendered conductive, nor will discharge occur across the gap 34. It will be easily seen that the voltage now impressed on the SSS is lower than if there was no discharge gap. This means that the provision of the discharge gap 34 helps prevent shortening the life of the SSS.

When a short circuit condition occurs on the secondary side of the intermediate transformer 18, the terminal voltage across the reactor 22 increases so that the voltages applied to the SSS 28 and the discharge gap 34 increase until the SSS 28 is rendered conductive, and a discharge occurs across the gap 34, thereby bypassing the reactor 22. Preferably, the arrangement is such that when the short circuit condition has been cleared, the SSS 28 restores itself to the original nonconductive state earlier than the termination of the discharge across the gap 34.

The reader of the specification may now have an impression that the use of a discharge gap in FIG. 3 (and also in FIG. 4) is contradictory to the principle of the invention. However, the discharge gap used in the invention need not have such highly stable a characteristic with respect to the commencement and termination of discharge as was required of the discharge gap in the prior art devices. With the arrangement of the present invention, even if no discharge occurs upon occurrence of a short circuit condition in the secondary circuit of the intermediate transformer, the SSS will be rendered conductive so that the whole of the terminal voltage of the reactor 22 will be impressed on the discharge gap 34, thereby causing a discharge to start. If the discharge does not stop even when the short circuit condition has been cleared, the SSS first becomes nonconductive, so that the voltage impressed on the gap 34 drops sufficiently to stop the discharge. If the SSS is inadvertently left destroyed, the discharge gap 34 alone will perform the protective function.

In FIG. 4, which is an improvement to FIG. 3, the shunt circuit 30 comprises a series combination of an SSS 28, a capacitor 32 and a discharge gap 34 connected in parallel with the reactor 22. In this arrangement, when a short circuit condition occurs on the secondary side of the intermediate transformer 18, the SSS 28 becomes conductive and a discharge takes place across the gap 34, so that the reactor 22 and the capacitor 32 forms a parallel resonant circuit, which suppresses the short circuit current which would otherwise flow through the device.

In this case, just as in FIG. 3, due to the presence of the discharge gap 34 the voltage impressed on the SSS 28 is lower than it was without the gap, so that the life of the SSS becomes longer. Also, the gap 34 may have a characteristic not so stable as in the prior art arrangement, as previously mentioned.

In FIG. 5, the invention is shown applied to a twin-type capacitor voltage transformer. In the previous embodiments a single intermediate transformer is employed. Here in FIG. 5, however, a pair of intermediate transformers 18 and 40 have their respective primary windings 20 and 42 connected across a shunt capacitor 16 so that two separate voltages can be obtained from the secondary windings 24 and 44 of the transformers. A load 26 is connected to the secondary winding 24 of the transformer 18. A pair of resonant reactors 22 and 46 are connected in series with the primary windings 20 and 24 of the transformers 18 and 40, respectively, and a pair of shunt circuits 30 and 48 are connected across the reactors 22 and 46, respectively. The shunt circuit 30 may comprise a series combination of an SSS 28 and a capacitor 32; and the other shunt circuit 48, a series combination of an SSS 50 and a capacitor 52.

When a short circuit condition occurs in the secondary circuit of, say, the transformer 18, the shunt circuit 30 bypasses the rector 22, thereby changing the resonant condition of the primary circuit of the capacitor voltage transformer and, consequently, suppressing the short circuit current therethrough in just the same manner as in FIG. 2. Therefore, the primary voltage, that it to say, the terminal voltage across the shunt capacitor 16 and consequently, the second voltage of the transformer 40 remain substantially uninfluenced by the short circuit condition on the secondary side of the transformer 18.

With a single intermediate transformer, if the secondary circuit thereof is short-circuited, there would be no voltage impressed on the load connected in the secondary circuit, so that if the load is a voltage protective relay, for example, it will operate to disconnect the system line from a source even when there is no disorder in the system line. It is necessary, therefore, to distinguish a disorder on the secondary side of the intermediate transformer and that in the system line, thereby preventing such erroneous operation of the protective relays as mentioned just above. To this end the arrangement of FIG. 5 is directed, wherein, if the disorder is in the system line, no voltage appears at the secondary sides of the two intermediate transformers 18 and 40, whereas if the disorder is in the secondary circuit of either one of the transformers, no voltage appears at the secondary side of that one transformer only. Therefore, if the secondary voltages of the intermediate transformers 18 and 40 are applied to a differential voltage relay 27, which is designed to operate by the difference between the two secondary voltages, it is possible to so arrange that the relay 26 operates only when the disorder is in the system line 10.

Having illustrated and described preferred embodiments of the invention, it is understood that the invention is not restricted thereto, but that there are many changes and modifications within the scope of the invention.

What we claim is:

1. A capacitor voltage transformer comprising: a series combination of a coupling capacitor and a shunt capacitor connected between a system line and ground; an intermediate transformer having its primary winding connected across said shunt capacitor; a load connected across the secondary winding of said intermediate transformer; a resonant reactor which is at series resonance with the combined capacitance of said capacitors; and a shunt circuit connected across at least one of said resonant reactor and said capacitors, said shunt circuit including the series combination of a discharge gap and a silicon symmetrical switch, the avalanche voltage of which is selected substantially equal to the voltage tolerable on the impedance across which said shunt circuit is connected and no greater than the voltage sufficient to initiate a discharge across said gap.

2. The device of claim 1, wherein the voltage sufficient to initiate a discharge across said gap is less than the avalanche voltage of said SSS.

3. The device of claim 2, wherein said shunt circuit further includes a capacitor connected in series with said SSS and said discharge gap.

4. The device of claim 1, wherein said shunt circuit further includes a capactior connected in series with said SSS and said discharge gap.

5. A capacitor voltage transformer comprising:
   (1) a series combination of a coupling capacitor and a shunt capacitor adapted to be coupled between a system line and ground;
   (2) first and second intermediate transformers each having its primary winding connected across said shunt capacitor;
   (3) first and second resonant reactors coupled, respectively, to said first and second intermediate transformers for series resonance with the combined capacitance of said capacitors;
   (4) first and second shunt circuits connected, respectively, across said first and second resonant reactors;
   (5) each of said shunt circuits including a silicon symmetrical switch, the avalanche voltage of which is no greater than the voltage tolerable on the resonant reactor across which said shunt circuit is connected;
   (6) a lead connected across the secondary of one of said intermediate transformers; and
   (7) means for detecting the difference between the secondary voltages of said first and second intermediate transformers so as to distinguish between a fault condition in the system line and a fault condition in the secondary circuit of said capacitor voltage transformer.

References Cited

UNITED STATES PATENTS

| | | |
|---|---|---|
| 2,991,396 | 7/1961 | Schurr. |
| 3,219,914 | 11/1965 | Gertsch _____ 317—16 X |

FOREIGN PATENTS

| | | |
|---|---|---|
| 120,484 | 8/1941 | Australia. |
| 237,212 | 8/1945 | Switzerland. |
| 928,923 | 6/1963 | Great Britain. |

LEE T. HIX, Primary Examiner

W. H. BEHA, JR., Assistant Examiner

U.S. Cl. X.R.

317—14, 16, 50; 323—61